Patented Feb. 2, 1943

2,310,013

UNITED STATES PATENT OFFICE 2,310,013

METHOD OF MAKING DIAZO PRINTING PASTES AND PRODUCT

Norman S. Cassel, Ridgewood, N. J., assignor to Interchemical Corporation, New York, N. Y., a corporation of Ohio No Drawing. Application July 22, 1939, Serial No. 285,969

6 Claims. (Cl. 8—71)

This invention relates to textile printing compositions, and has particular reference to new and novel compositions useful in the preparation of textile printing pastes, and to means for preparing printing pastes therefrom.

In my copending application, Serial Number 215,585, filed June 24, 1938, now U. S. Patent No. 2,202,283, issued May 28, 1940, I have disclosed a means whereby the disadvantages of conventional textile printing pastes (such as poor printing, inability to print from photogravure cylinders, and lack of economy due to loss of dyestuff) may be overcome, and successful dyestuff printing can be done with photogravure and other relatively shallow engravings, with the retention of the complete detail of the photogravure cylinders, and the use of a minimum of dyestuff. As therein disclosed, this means comprises the preparation of dyestuff printing pastes by the emulsification of an aqueous solution of a dyestuff or a dyestuff component with a water immiscible bodying composition (preferably a solution of a film-forming substance in a solvent), the dyestuff solution being in the discontinuous phase. The resultant emulsion, of optimum consistency for printing, is applied to a fabric, as with a conventional intaglio cylinder; the dyestuff is fixed on the fabric, and the fabric is then dried, with or without washing, depending on the dyestuff employed.

As the emulsion is applied to the cloth and the emulsion breaks, the dyestuffs solution penetrates into the yarns of the fabric. Since the water phase and the bodying agent are mutually repellant, the non-aqueous phase prevents undue spreading of the aqueous phase. As a result, substantially no flushing occurs, and fine printing is obtained, which preserves the fine lines of a photogravure engraving even on materials which are as difficult to print as cotton flannels.

Dyestuffs and dyestuff components containing diazo groups are particularly useful in the preparation of emulsion printing pastes of this type, although their cost is rather high, and many of them are unstable on storage in solution in water, even when protected by the emulsion.

I have discovered a simple means of economically preparing emulsions containing diazo compounds. My invention consists in diazotizing a diazotizable base in the presence of water which is dispersed as the inner phase of a water-in-lacquer emulsion, to produce an emulsion of a solution of a diazo compound in a continuous lacquer phase. This emulsion may then be ready for application as a printing paste, or be converted into a paste by the simple addition of the necessary ingredients. It is thus possible to economically produce a printing paste just before printing, which presents no storage problems.

The diazotizable base may be dispersed in a vehicle which has no solvent action thereon, or may be dissolved in the vehicle; it is only necessary that the vehicle be capable of emulsifying the water in it. I have discovered that on treatment with aqueous acid and a nitrite, the diazotization of the base occurs rapidly and smoothly. Where the salt of the base is water soluble, it dissolves in the water globules and is thus made available for rapid and complete action in small increments; while the insoluble salts are kept suspended and in contact with the nitrous acid by being suspended in the continuous phase. This intimate contact between small bodies of both reactants seems to be ideal for the diazotization reaction, so that unusually effective action is obtained.

In most cases, I prefer to add the aqueous acid solution to the emulsifiable base, to form an emulsion of the soluble salt of the base, before adding the nitrite. However, it is sometimes desirable to reverse the procedure, and the salt and nitrite may be added simultaneously.

The diazotizable bases are preferably such as yield diazo compounds of the class known as fast color salts, which couple with bases of the class consisting of beta-oxy-naphthoic acid and its derivatives to produce fast dyeings on cotton, viscose rayon and the like.

The emulsifiable vehicle is preferably a solution of a thickener in a volatile organic solvent. Lacquers made of alkyd and other resins, cellulose derivatives (in particular, ethyl cellulose) and other thickeners, dissolved in water immiscible solvents such as aliphatic and aromatic hydrocarbons, esters and the like, may be used. It is important that the lacquer be strongly hydrophobic, so that it forms relatively stable water-in-lacquer emulsions even when acids and salts are dissolved in the aqueous phase.

If the lacquer used is to be made into a textile printing paste directly without further addition of solvent or thickener, it is desirable that the lacquer have a low thickener content, so that the printing pastes made therefrom contain under about 5% thickener, and preferably a much lower percentage. This low percentage of thickener permits of the production of printing pastes in which the thickener need not be removed from the fabric. Since these pastes ordinarily require at least 0.5% by weight of base, a ratio of 10 thickener to 1 diazotizable base should not in general be exceeded, if the material is to be used for printing after emulsification.

Typical examples of my invention are the following:

*Example 1*

| | Parts by weight |
|---|---|
| Blue B Base (Dianisidine) | 0.5 |
| are added to a mixture of | |
| Alkyd resin solution | 3.0 |
| Pine oil | 5.0 |
| Solvesso #3 (hydrogenated petroleum naphtha) (Boiling range 175–210° C.) | 19.9 |

The alkyd resin solution is made by reacting 148 phthalic anhydride, 110 glycerol and 125 castor oil fatty acids to 230° C., in the presence of carbon dioxide until the acid number is about 8, and then reducing to 50% non-volatile with a mixture of 30 pine oil and 70 Solvesso #2 (hydrogenated petroleum naphtha (boiling range 135–177° C.)). This is a stable liquid. A printing paste may be prepared from this by adding, while stirring—

| | Parts by weight |
|---|---|
| HCl (29° Tw.) | 1.3 |
| in | |
| Water at 80° C. | 20.0 |
| The emulsion formed is then cooled to about 0 to 5° C., and | |
| NaNO₂ | 0.3 |
| in | |
| Water at 0–5° C. | 50.0 |
| is emulsified into it. | |

Diazotization proceeds rapidly, along with emulsification. The paste is ready for printing in about thirty minutes, and may be applied to a fabric impregnated, for example, with the anilide of beta-oxy-naphthoic acid.

*Example 2*

| | Parts by weight |
|---|---|
| Dianisidine (Blue B Base) | 0.5 |
| is added to a solution of | |
| Ethyl cellulose (250 centipoise) | 0.8 |
| in | |
| Xylol | 8.2 |
| Pine oil | 3.0 |
| Solvesso #3 | 25.0 |
| into this is emulsified— | |
| HCl (29° Tw.) | 1.3 |
| in | |
| Water at 80° C. | 20.0 |
| this is cooled to 0–5° C., and | |
| NaNO₂ | .3 |
| in | |
| Cold water (0–5° C.) | 30.0 |
| is emulsified in, after diazotization is complete, in 20 to 40 minutes | |
| Sodium acetate | 0.4 |
| dissolved in | |
| Water | 11.0 |
| is added to neutralize excess acid. The paste is then ready for printing. | |

*Example 3*

| | Parts by weight |
|---|---|
| Scarlet RC Base (meta nitro ortho-anisidine) | 0.6 |
| is added to an organic phase of | |
| Ethyl cellulose (250 centipoise) | 0.8 |
| Xylol | 8.2 |
| Solvesso #3 | 25.0 |
| Pine oil | 3.0 |
| Into this is emulsified— | |
| HCl (29° Tw.) | 0.6 |
| in | |
| Water (25° C.) | 20.0 |
| This is cooled to 0–5° C. | |
| NaNO₂ | 0.2 |
| in | |
| Cold water (0–5° C.) | 41.0 |
| is added. | |

After diazotization is complete (about 30 minutes) the whole is buffered with

| | Parts by weight |
|---|---|
| Sodium acetate | 0.6 |
| dissolved in | |
| Water | 10.6 |

*Example 4*

| | Parts by weight |
|---|---|
| Blue B B Base (4 benzoyl amino 3:6 diethoxy aniline) | |

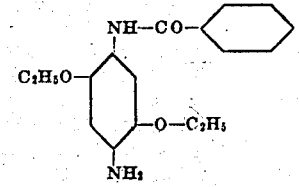

| | |
|---|---|
| is added to an organic phase of | |
| Ethyl cellulose (250 centipoise) | 0.8 |
| Pine oil | 3.0 |
| Xylol | 8.2 |
| Solvesso #3 | 25.0 |
| Into this is emulsified | |
| NaNO₂ | 0.4 |
| in | |
| Water at 0–5° C. | 39.3 |
| and | |
| HCl (29° Tw.) | 1.7 |
| in | |
| Water at 0–5° C. | 20.0 |
| is then added. Diazotization is complete in 15–30 minutes. | |

Various changes in the examples can be made without departing from the scope of the invention, which is defined in the claims. While I have shown the invention as applicable to the preparation of textile printing pastes, it can, of course, be used wherever an emulsion of a diazotizable base solution is desirable.

I claim:

1. The method of diazotizing a diazotizable base which comprises conducting the diazotization while the base is in contact with water which forms the inner phase of a water-in-oil emulsion.

2. The method of diazotizing a diazotizable base which comprises preparing a mixture of the base with a water immiscible liquid capable of emulsifying water therein, and adding aqueous fluid containing reactants which will cause diazotization of the base, whereby the base is diazotized and dissolved in the water to form an emulsion of a solution of a diazo compound in a continuous water immiscible phase.

3. The method of diazotizing a diazotizable base which comprises preparing a mixture of the base with a water immiscible lacquer capable of emulsifying water therein, and adding aqueous fluid containing reactants which will cause diazotization of the base, whereby the base is diazotized and dissolved in the water to form an emulsion of a solution of a diazo compound in a continuous water immiscible lacquer phase.

4. The method of diazotizing a diazotizable base which comprises preparing a mixture of the base with a water immiscible liquid capable of emulsifying water therein, adding an aqueous fluid in which the base is soluble, to form a water-in-oil emulsion, and thereafter adding to the emulsion and aqueous solution of chemical capable of reacting with the base to form a diazo compound.

5. The method of preparing a printing paste for textile fabrics containing a diazo compound, which comprises preparing a mixture of a diazotizable base and a lacquer capable of emulsifying water therein, emulsifying an aqueous acid solution into the lacquer to produce an emulsion with the base in solution in the water, and thereafter emulsifying an aqueous solution of a diazotizing agent into the emulsion.

6. The method of diazotizing a diazotizable base which comprises diazotizing the base with aqueous solutions of diazotization reactants while the aqueous solutions of the diazotization reactants are dispersed as the inner phase of a water-in-oil emulsion.

NORMAN S. CASSEL.